(12) United States Patent
Park

(10) Patent No.: US 7,679,241 B2
(45) Date of Patent: Mar. 16, 2010

(54) VIBRATION MOTOR

(75) Inventor: Young Il Park, Gunpo-si (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/401,236

(22) Filed: Mar. 10, 2009

(65) Prior Publication Data

US 2009/0230797 A1    Sep. 17, 2009

(30) Foreign Application Priority Data

Mar. 11, 2008   (KR) ............... 10-2008-0022483

(51) Int. Cl.
*H02K 7/06* (2006.01)
(52) U.S. Cl. ........................................ 310/81
(58) Field of Classification Search ............ 310/81, 310/90, 67 R
See application file for complete search history.

(56) References Cited

U.S. PATENT DOCUMENTS 5,677,584 A * 10/1997 Keck ...................... 310/90
6,998,742 B2 * 2/2006 Yamaguchi et al. ........ 310/81

* cited by examiner

*Primary Examiner*—Dang D Le
(74) *Attorney, Agent, or Firm*—Saliwanchik, Lloyd & Saliwanchik

(57) ABSTRACT

Disclosed is a vibration motor. The vibration motor includes a bracket including a support tube protruding from the bracket, a case coupled with the bracket, a support shaft supported by the bracket and the case, a bearing rotatably fitted around the support shaft, a rotor fixed to the bearing to rotate together with the bearing, thereby generating vibration, a stator mounted on the bracket to rotate the rotor through interaction with the rotor, a support member installed around the support tube, and a first washer interposed between the support tube and the bearing and supported by the support member.

20 Claims, 2 Drawing Sheets

VIBRATION MOTOR

CROSS REFERENCE TO RELATED APPLICATION

The present application claims the benefit under 35 U.S.C. §119 of Korean Patent Application No. 10-2008-0022483, filed Mar. 11, 2008, which is hereby incorporated by reference in its entirety.

BACKGROUND

The present invention relates to a vibration motor.

An electronic appliance such as mobile communication equipment includes a vibration motor generating vibration as an incoming signal or an input signal.

The vibration motor includes an eccentric rotor, which is rotatably installed in a housing and provided therein with a coil, and a stator including a magnet facing the eccentric rotor. Accordingly, if a current is applied to the coil, the rotor rotates due to the interaction between the coil and the magnet, thereby generating vibration.

BRIEF SUMMARY

Embodiments provide a vibration motor having a new structure.

An embodiment provides a vibration motor having superior endurance against external shock.

According to an embodiment, a vibration motor includes a bracket including a support tube protruding from the bracket, a case coupled with the bracket, a support shaft supported by the bracket and the case, a bearing rotatably fitted around the support shaft, a rotor fixed to the bearing to rotate together with the bearing thereby generating vibration, a stator mounted on the bracket to rotate the rotor through interaction with the rotor, a support member installed around the support tube, and a first washer interposed between the support tube and the bearing and supported by the support member.

DETAILED DESCRIPTION

Hereinafter, a vibration motor according to an embodiment will be described with reference to accompanying drawings.

Figure 1:
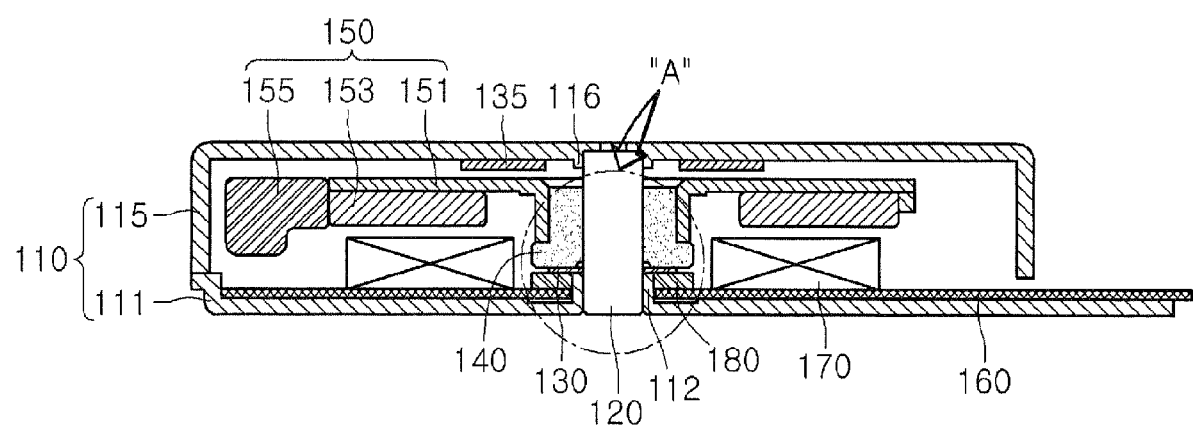
FIG. 1 is a sectional view showing a vibration motor according to an embodiment of the present invention.
Figure 2:
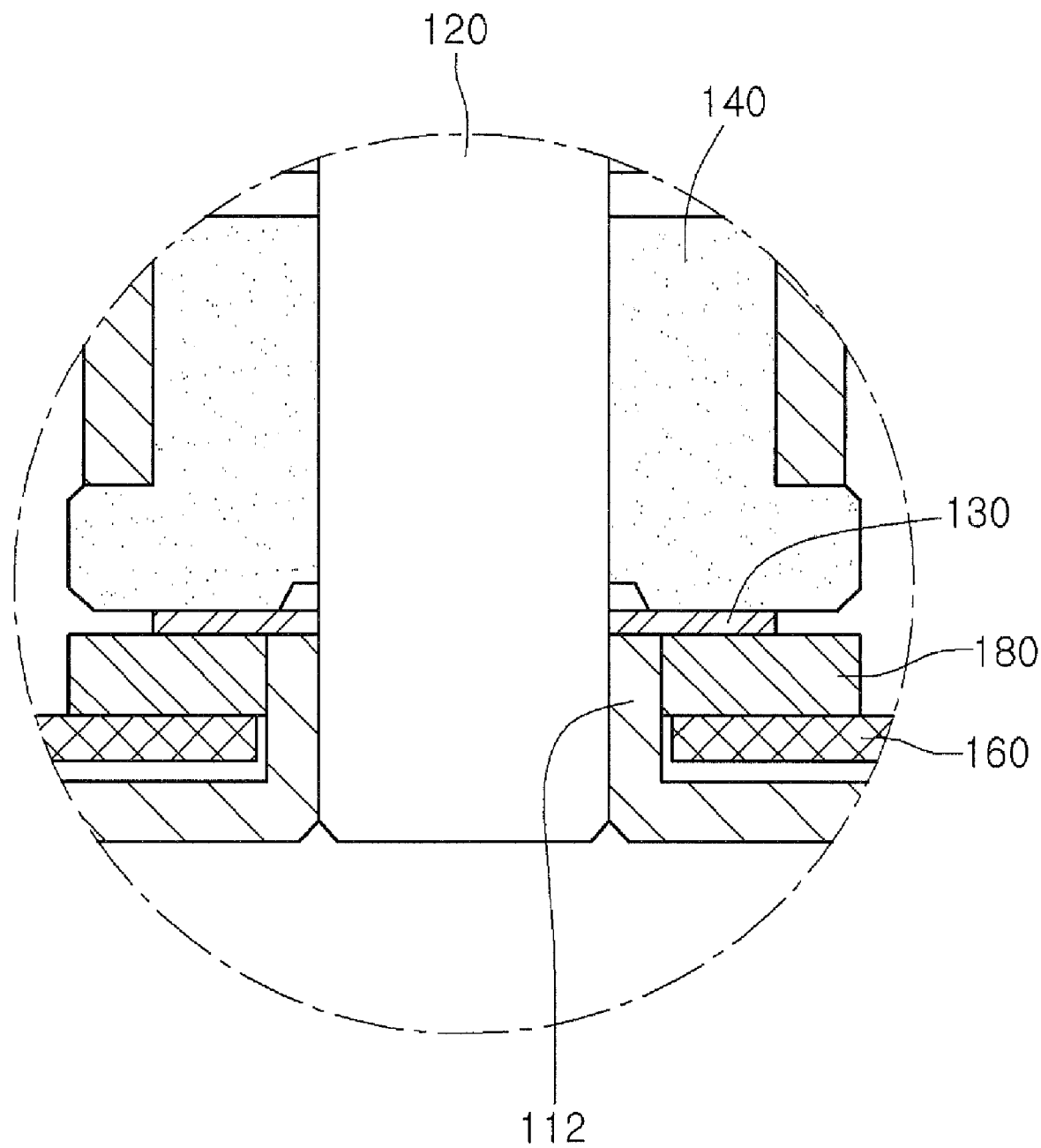
FIG. 2 is an enlarged view of a part A of FIG. 1.

FIG. 1 is a sectional view showing a vibration motor according to an embodiment, and FIG. 2 is an enlarged view showing a part A of FIG. 1.

Referring to FIGS. 1 and 2, the vibration motor includes a housing 110 with a bracket 111 and a case 115. The housing 110 has a space in which a rotor 150 and a stator 170 are installed. The case 115 is provided on the bracket 111 so that the case 115 is coupled with the bracket 111.

The case 115 and the bracket 111 may be manufactured by using the same material or different materials. For example, the case 115 may include a metallic material, and the bracket 111 may include a printed circuit board. According to the embodiment, both the case 115 and the bracket 111 include a metallic material. When the bracket 111 is prepared in the form of the printed circuit board, a printed circuit board 160 that is described later may be omitted.

The housing 110 is provided therein with a support shaft 120.

The support shaft 120 is coupled with a support tube 112 protruding from the bracket 111 and a groove 116 formed in the case 115 so that the support shaft 120 is supported. In other words, a lower end of the support shaft 120 is fixedly inserted into the support tube 112, and an upper end of the support shaft 120 is inserted into the groove 116 so that the support shaft 120 is supported.

A bearing 140 is rotatably fitted around the support shaft 120.

The rotor 150 is coupled with the bearing 140. The rotor 150 includes a rotor yoke 151 press-fitted around an outer surface of the bearing 140, a magnet 153 coupled with the rotor yoke 151, and a weight 155. The rotor 150 generates vibration while rotating together with the bearing 140.

A first washer 130 is fitted around the support shaft 120. The first washer 130 is interposed between the bearing 140 and the bracket 111 to inhibit the bearing 140 from directly making contact with the bracket 111, thereby inhibiting the bearing 140 from being worn and reducing noise.

According to an embodiment, the first washer 130 is interposed between the bearing 140 and the support tube 112.

The printed circuit board 160 is mounted on the bracket 111, and the stator 170 is provided on the printed circuit board 160. The stator 170 includes a coil that interacts with the magnet 153 as power is applied to the coil from the printed circuit board 160, thereby rotating the rotor 150 to generate the vibration.

Although not shown, the bracket 110 may be provided thereon with an integrated circuit (IC), a hall element, and a cogging plate. In addition, the stator 170 may be installed on the bracket 110 through the printed circuit board 160.

A support member 180 is mounted on the printed circuit board 160 in the vicinity of the support tube 112. The support member 180 includes synthetic resin, so that the support member 180 may be fixedly bonded with the printed circuit board 160.

In addition, the support member 180 includes a material the same as that of the first washer 130. For example, the first washer 130 and the support member 180 may include a metallic material.

The support member 180 may be fitted around the support tube 112. The support member 180 may have an elastic property.

A top surface of the support member 180 can be arranged in line with a top surface of the support tube 112. A bottom surface of the first washer 130 can make contact with the top surface of the support member 180 and the top surface of the support tube 112. In other words, the first washer 130 is supported by the support tube 112 and the support member 180.

In this case, the first washer 130 can have an outer diameter larger than that of the support tube 112, and smaller than that of the support member 180.

As the vibration motor has been fabricated in a slim structure and a compact size, the thickness of the bracket 111 and the case 115 has become reduced, so the thickness of the support tube 112 is also reduced. However, since the first washer 130 must have a predetermined diameter to smoothly support the bearing 140, and the thickness of the support tube 112 is reduced, the support tube 112 may not sufficiently support a lower portion of the first washer 130.

Accordingly, when external shock is applied to the vibration motor, the bearing 140 moves along the support shaft 130 to deform an outer circumference of the first washer 130.

However, according to an embodiment, the vibration motor is provided therein with the support member 180, so that the first washer 130 can be stably supported by the support tube 112 and the support member 180 without being deformed.

In addition, according to an embodiment, the vibration motor is supported by the support member 180 having an elastic property, so that the shock can be absorbed by the support member 180. Accordingly, the first washer 130 can be inhibited from being deformed.

Meanwhile, a second washer 135 may be interposed between the rotor 150 and the case 115. The second washer 135 can be fixed to the case 115 to inhibit the rotor 150 from directly making contact with the case 115, thereby inhibiting the rotor 150 from being worn and reducing noise.

As described above, according to the vibration motor of the embodiment, the first washer 130 is supported by the support tube 112 and the support member 180, thereby inhibiting the first washer 130 from being deformed due to external shock, and improving the life span and the reliability of the vibration motor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vibration motor comprising:
   a bracket including a support tube protruding from the bracket;
   a case coupled with the bracket;
   a support shaft supported by the bracket and the case;
   a bearing rotatably fitted around the support shaft;
   a rotor fixed to the bearing to rotate together with the bearing, thereby generating vibration;
   a stator mounted on the bracket to rotate the rotor through interaction with the rotor;
   a support member installed around the support tube; and
   a first washer interposed between the support tube and the bearing and supported by the support member,
   wherein the outermost perimeter of the support member has a diameter less than that of the innermost perimeter of the stator.

2. The vibration motor of claim 1, wherein the first washer makes contact with the support tube and the support member.

3. The vibration motor of claim 1, wherein top surfaces of the support tube and the support member are arranged in line with each other.

4. The vibration motor of claim 1, wherein the bracket is provided thereon with a printed circuit board, the stator includes a coil electrically connected to the printed circuit board, and the support member is mounted on the printed circuit board.

5. The vibration motor of claim 4, wherein the support member is fixedly bonded with the printed circuit board.

6. The vibration motor of claim 1, wherein the support member comprises a synthetic resin material.

7. The vibration motor of claim 1, wherein the support member has an elastic property.

8. The vibration motor of claim 1, wherein the support member includes a material identical to a material of the first washer.

9. The vibration motor of claim 1, wherein the case is provided therein with a groove into which an upper end of the support shaft is inserted, so that the support shaft is supported.

10. The vibration motor of claim 1, wherein the first washer has an outer diameter larger than an outer diameter of the support tube and smaller than an outer diameter of the support member.

11. The vibration motor of claim 1, wherein the bracket includes a printed circuit board.

12. The vibration motor of claim 1, further comprising a second washer interposed between the rotor and the case.

13. The vibration motor of claim 1, wherein the first washer has a top surface making contact with the bearing, and a bottom surface making contact with the support tube and the support member.

14. A vibration motor comprising:
    a bracket including a support tube protruding from the bracket;
    a case coupled with the bracket;
    a support shaft supported by the bracket and the case;
    a bearing rotatably fitted around the support shaft;
    a rotor fixed to the bearing to rotate together with the beams thereby generating vibration;
    a stator mounted on the bracket to rotate the rotor through interaction with the rotor;
    a support member installed around the support tube; and
    a first washer interposed between the support tube and the bearing and supported by the support member,
    wherein the support member is spaced from the stator.

15. The vibration motor of claim 14, wherein a topmost surface of the support tube and a topmost surface of the support member are arranged in line with each other.

16. The vibration motor of claim 14, wherein the outermost perimeter of the support member has a diameter less than that of the innermost perimeter of the stator.

17. The vibration motor of claim 14, wherein the bracket is provided thereon with a printed circuit board, the stator includes a coil electrically connected to the printed circuit board, and the support member is mounted on the printed circuit board.

18. The vibration motor of claim 14, wherein the support member comprises a synthetic resin material.

19. The vibration motor of claim 14, further comprising a second washer interposed between the rotor and the case.

20. The vibration motor of claim 14, wherein the first washer has a top surface making contact with the bearing, and a bottom surface making contact with a topmost surface of the support tube and a topmost surface of the support member.

* * * * *